(12) United States Patent
Morita

(10) Patent No.: US 7,152,826 B2
(45) Date of Patent: Dec. 26, 2006

(54) TAPE REEL

(75) Inventor: Kiyoo Morita, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 513 days.

(21) Appl. No.: 10/020,956

(22) Filed: Dec. 19, 2001

(65) Prior Publication Data

US 2002/0084379 A1     Jul. 4, 2002

(30) Foreign Application Priority Data

Dec. 19, 2000   (JP)   ................... P. 2000-385602

(51) Int. Cl.
*B65H 75/12*   (2006.01)
(52) U.S. Cl. .................................... 242/614
(58) Field of Classification Search ............... 242/345, 242/407, 614; 360/132
See application file for complete search history.

(56) References Cited

U.S. PATENT DOCUMENTS 3,342,435 A * 9/1967 Gelardi et al. ............. 242/614
3,892,370 A * 7/1975 Nelson ..................... 242/580.1
4,807,826 A * 2/1989 Iwahashi ................... 242/608
5,456,423 A * 10/1995 Sakurai et al. ............. 242/614
5,474,253 A * 12/1995 Kasetty et al. ............. 242/614
5,474,254 A * 12/1995 Faulkner ................... 242/614
5,803,388 A * 9/1998 Saliba et al. ............... 242/348

FOREIGN PATENT DOCUMENTS

JP          11-203818        7/1999
JP        2000-243054        9/2000

* cited by examiner

*Primary Examiner*—William A. Rivera
*Assistant Examiner*—Sang Kim
(74) *Attorney, Agent, or Firm*—Sughrue Mion, PLLC

(57) ABSTRACT

A tape reel includes a hub in a cylindrical shape around which a magnetic tape is adapted to be wrapped, an upper flange and a lower flange respectively provided at an upper end and a lower end of the hub. The tape reel is constructed in such a manner that a distance between the upper and the lower flanges outside the outer peripheral surface of the hub is gradually decreased, as the magnetic tape is being wrapped around the hub.

3 Claims, 4 Drawing Sheets

US 7,152,826 B2

TAPE REEL

BACKGROUND OF THE INVENTION

The present invention relates to a tape reel to be applied to a magnetic tape cassette and, more particularly, to the tape reel having an upper flange and a lower flange provided at an upper end and a lower end of a hub, respectively.

Conventionally, there have been various types of magnetic tape cassettes for a video, for an audio apparatus, for a computer, etc. Some of the magnetic tape cassettes for videos, for example, are constructed such that a pair of tape reels is contained in a cassette case consisting of an upper cassette half and a lower cassette half. The pair of tape reels each has a hub, an upper flange and a lower flange. A tape reel rotates in a state where a magnetic tape has been wrapped around an outer periphery of the hub.

FIG. 4 shows one example of a tape reel. This tape reel 110 has a cylindrical hub 111, an upper flange 112 in a disc-like shape which is fixed to an upper end of the hub 111, and a lower flange 113 in a disc-like shape which is integrally molded with the hub 111 at a lower end of the hub. A magnetic tape 120 is adapted to be wrapped around an outer peripheral surface of the cylindrical hub 111.

A distance between the upper flange 112 and the lower flange 113 is set to be appropriately larger than a width of the magnetic tape 120. In this example, the magnetic tape 120 is wrapped around the hub 111 in such a manner that a clearance is created between an upper face of the lower flange 113 and an end of the magnetic tape 120 in a width direction of the magnetic tape 120. According to the cases, the magnetic tape 120 may be wrapped around the hub 111 in such a manner that the end of the magnetic tape 120 may be contacted with the upper face of the lower flange 113 in the width direction.

In recent years, for the purpose of improving volumetric recording density, the magnetic tape has been made thinner, and for the purpose of improving planimetric recording density, tracks have been made narrower.

As the magnetic tape has been made thinner, deformation of the magnetic tape in a width direction thereof has become likely to happen. For example, on occasion of high-speed running or acceleration or deceleration of the magnetic tape in a recording and reproducing apparatus, the magnetic tape may sometimes be deformed in the width direction. In addition, the magnetic tape may sometimes be locally brought into tight contact with guide rollers or the like. That results in the occurrence of curving or weaving of the magnetic tape. Moreover, due to the deformation of the magnetic tape, the ends of the magnetic tape in the width direction may come in contact with the lower face of the upper flange and the upper face of the lower flange, resulting in occurrence of the abrasion powder. This abrasion powder will incur an increase of dropouts. Particularly, when an amount of the magnetic tape wrapped around the hub is small, there will be a long distance from outer circumferential edges of the upper and the lower flanges to a face of the most outer layer of the magnetic tape already wrapped. Therefore, it is difficult to move the magnetic tape for this long distance without a hard or forceful contact with the lower face of the upper flange and the upper face of the lower flange in the width direction. If the magnetic tape comes in forceful contact with one of the lower face of the upper flange and the upper face of the lower flange on this occasion, the ends of the magnetic tape may be damaged, or abrasion powder may occur.

In the meantime, as the tracks of the magnetic tape have been made narrower, a so-called "linearity defect," wherein reproduction output power at the deformed portion of the tape becomes lower than that at a rectilinear portion, has become likely to occur. Even with a minute deformation of the tape, the linearity defect may occur. The above described weaving of the magnetic tape will incur an increase of the linearity defects, that is, will incur an increase of fluctuations in the reproduction output.

Further, a so-called "irregular wrapping" is likely to happen, as the magnetic tape has been made thinner. For example, as shown in FIG. 5, which is an enlarged perspective view of a part A in FIG. 4, a portion of the lateral end of the magnetic tape may jump out from a plane composed of the other lateral ends of the magnetic tape in the width direction. As shown in FIG. 5, the portion 120a of the end of the magnetic tape that has jumped out is deformed so as to meander. When the magnetic tape has been deformed, normal recording and reproduction cannot be expected. Therefore, it is an extremely important problem to prevent such an irregular wrapping.

Although various factors are considered as causes of occurrence of the irregular wrapping, it may be considered as one of the causes that when the magnetic tape 120 is wrapped around the hub 111 of the tape reel 110, air may intrude between adjacent magnetic tapes, and when the air escapes, it may push up the magnetic tape.

SUMMARY OF THE PRESENT INVENTION

In order to prevent the deformation in a width direction and the irregular wrapping of the magnetic tape, it is considered to make a distance between the upper and the lower flanges as small as the width of the magnetic tape. However, by doing so, it will become difficult to insert the magnetic tape between the upper and lower flanges without interfering with the outer circumferential edges of the upper and the lower flanges. Consequently, it will become difficult to wrap the magnetic tape around the hub.

The invention has been made in view of the above described circumstances, and its object is to provide a tape reel wherein a magnetic tape can be smoothly wrapped around a hub without incurring damage of the magnetic tape and occurrence of abrasion powder and an irregular wrapping. Its object is also a method of wrapping the magnetic tape around the tape reel.

According to the invention, a tape reel comprising a hub shaped in a cylindrical shape around which a magnetic tape is adapted to be wrapped, an upper flange and a lower flange respectively provided at an upper end and a lower end of the hub is characterized in that the tape reel includes means for gradually decreasing a distance between the upper flange and the lower flange outside an outer peripheral surface of the hub, as the magnetic tape is being wrapped around the hub, by deflecting said upper and lower flanges towards each other over an entire circumference thereof.

Further, according to the invention, a method of wrapping a magnetic tape around a tape reel wherein the tape reel comprises a hub shaped in a cylindrical shape around which the magnetic tape is adapted to be wrapped, an upper flange and a lower flange respectively provided at an upper end and a lower end of the hub is characterized in that a distance between the upper and the lower flanges outside an outer peripheral surface of the hub is gradually decreased, as the magnetic tape is wrapped around the hub.

According to the above described structure, as the magnetic tape is being wrapped around the hub of the tape reel, a force of tightening the hub (wrapping and tightening force) with the magnetic tape will be increased, and at the same time, the distance between the upper and the lower flanges is gradually decreased. Namely, while an amount of the magnetic tape wrapped around the hub is small, the distance between the upper and the lower flanges is rather large, and the magnetic tape can be moved to a neighborhood of the outer peripheral surface of the hub easily. On the other hand, when the amount of the magnetic tape wrapped around the hub has become large so that an irregular wrapping may be likely to occur, the distance between the upper and the lower flanges is made narrow. Thus, intruded air can be appropriately removed to prevent the irregular wrapping. In addition, deformation of the magnetic tape in the width direction can be also prevented.

More specifically, the distance between the upper and the lower flanges can be gradually decreased to the optimum according to the amount of the wrapped magnetic tape, by setting rigidity of the hub, manner of fixing the upper and the lower flanges to the hub, material of the tape reel, wrapping torque, etc. at predetermined values.

DETAILED DESCRIPTION OF THE PREFERRED EMBODIMENTS

Figure 1:
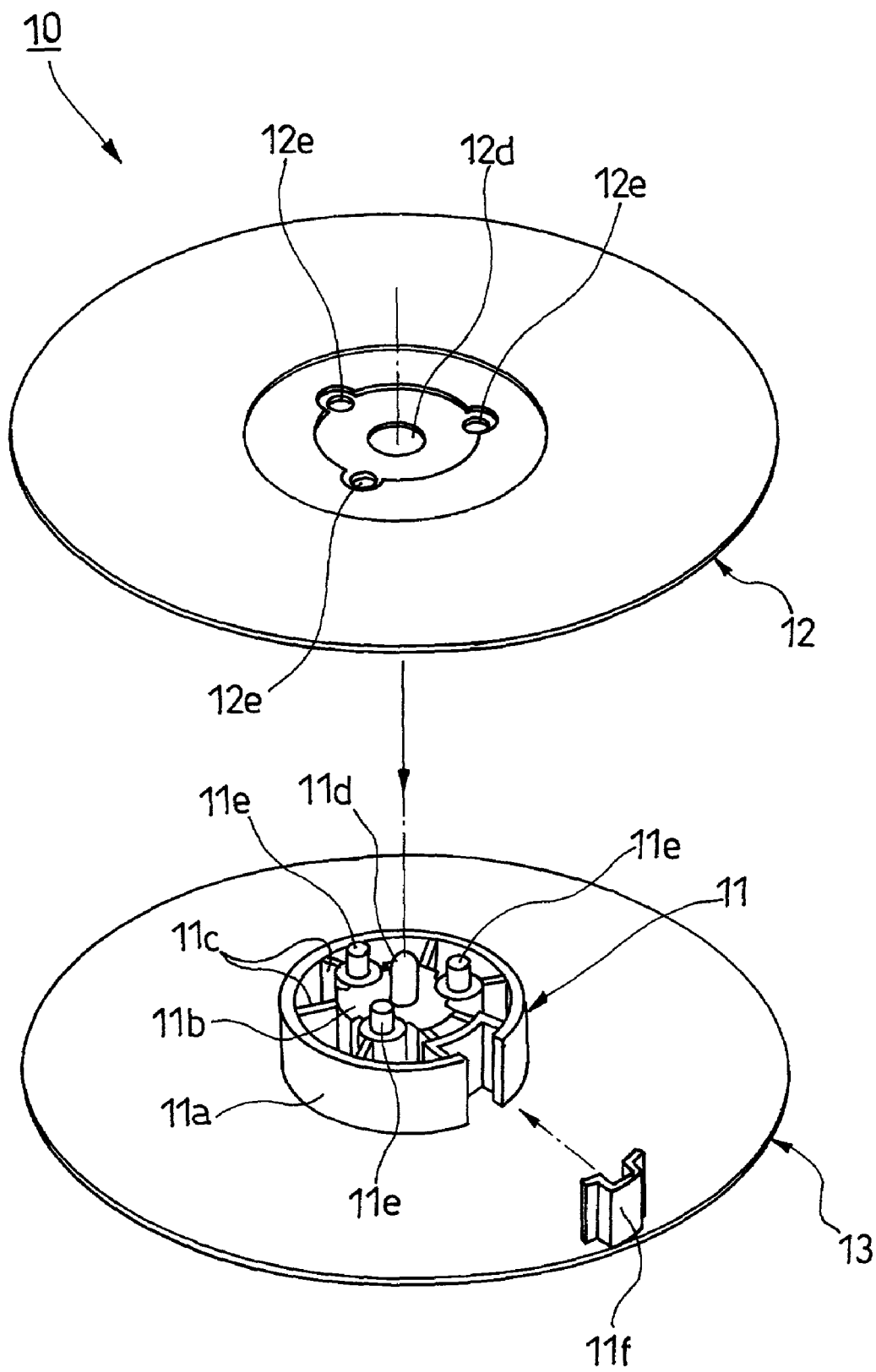
FIG. 1 is an exploded perspective view of a tape reel of an embodiment according to the invention.

Now, an embodiment of the invention will be described in detail referring to the drawings. FIG. 1 is an exploded perspective view of a tape reel 10 of a first embodiment, and FIG. 2 is a sectional view of a half of the tape reel 10.

As shown in FIG. 1, in this tape reel 10, a hub 11 and a lower flange 13 are integrally molded. The hub 11 has a substantially cylindrical outer peripheral wall 11a, a center part 11b in a substantially columnar shape which is arranged inside the outer peripheral wall 11a, and support walls 11c radially extending from the center part 11b toward the outer peripheral wall 11a. A pivot lid is provided at a center of an upper end face of the center part 11b. A plurality of (three in this embodiment) weldable bosses 11e are formed around the pivot 11d. A clamp member 11f is fitted to the outer peripheral wall 11a. In an upper flange 12, there are formed with through holes 12d, 12e at positions corresponding to the pivot 11d and the weldable bosses 11e of the hub 11. In a state where the upper flange 12 is placed on the hub 11 so that the pivot 11d and the weldable bosses 11e are inserted into these through holes 12d, 12e, the weldable bosses 11e are welded by ultrasonic waves. Thus, the upper flange 12 is bonded to the hub 11 by welding.

Figure 2:
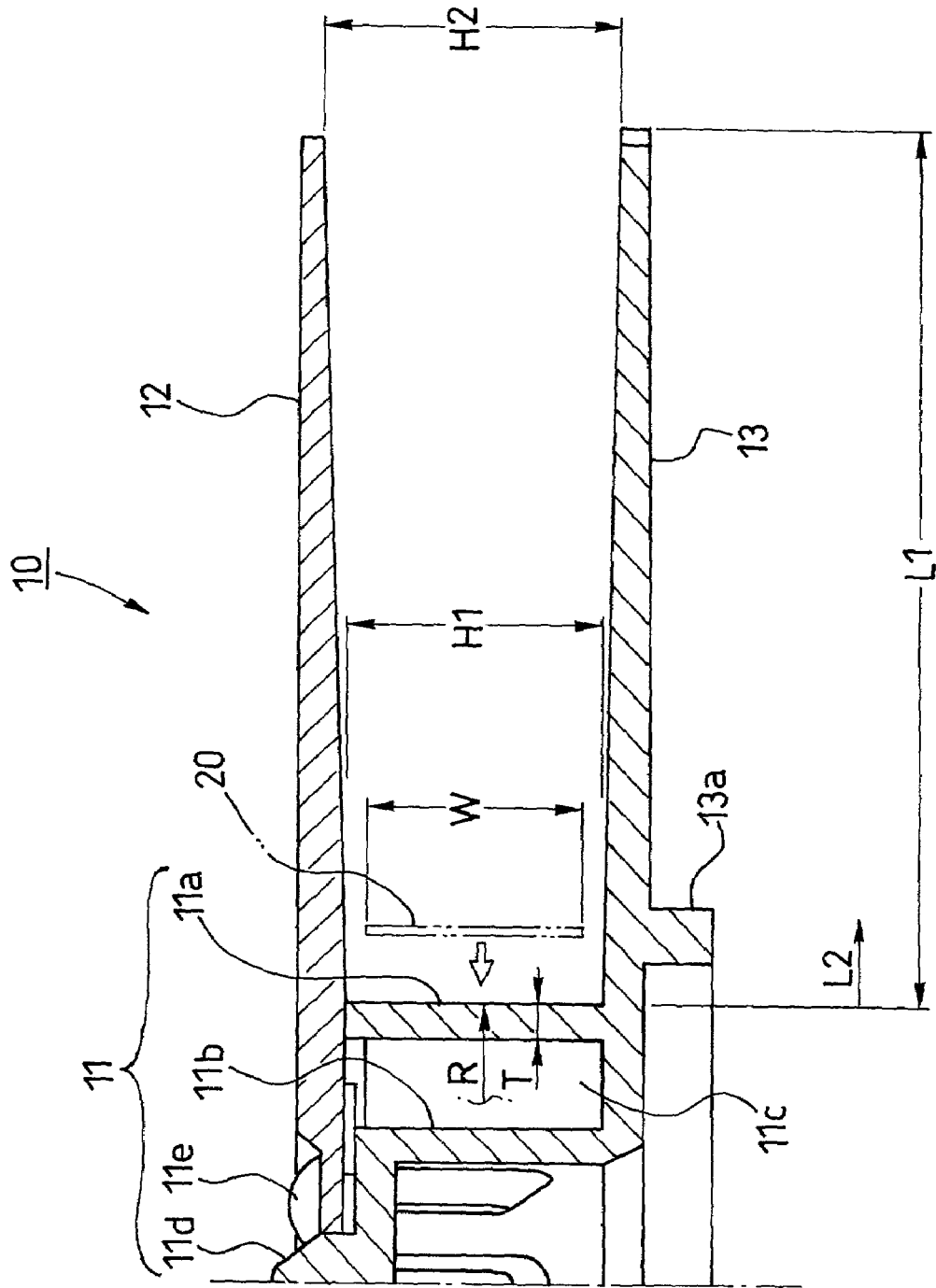
FIG. 2 is a sectional view of a half of the tape reel of the embodiment according to the invention.

In this embodiment, as shown in FIG. 2, a lower face of the upper flange 12 is inclined upwardly towards an outside in a radial direction of the tape reel, and an upper face of the lower flange 13 is inclined downwardly towards the outside in the radial direction of the tape reel. The lower flange 13 has an annular ring portion 13a formed on its lower face.

Figure 4:
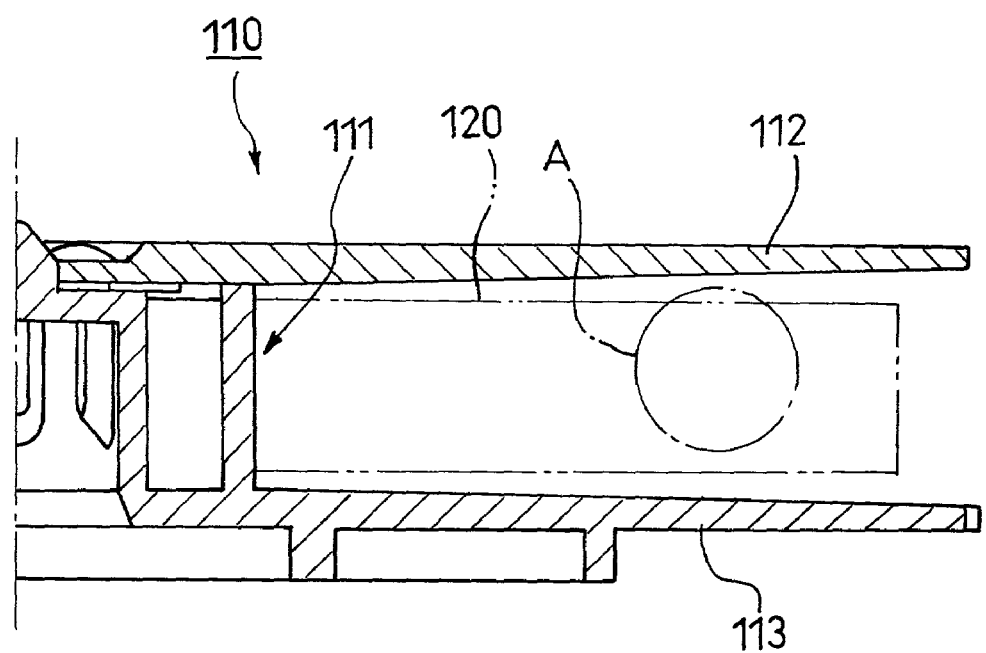
FIG. 4 is a sectional view of a half of a conventional tape reel.
Figure 5:
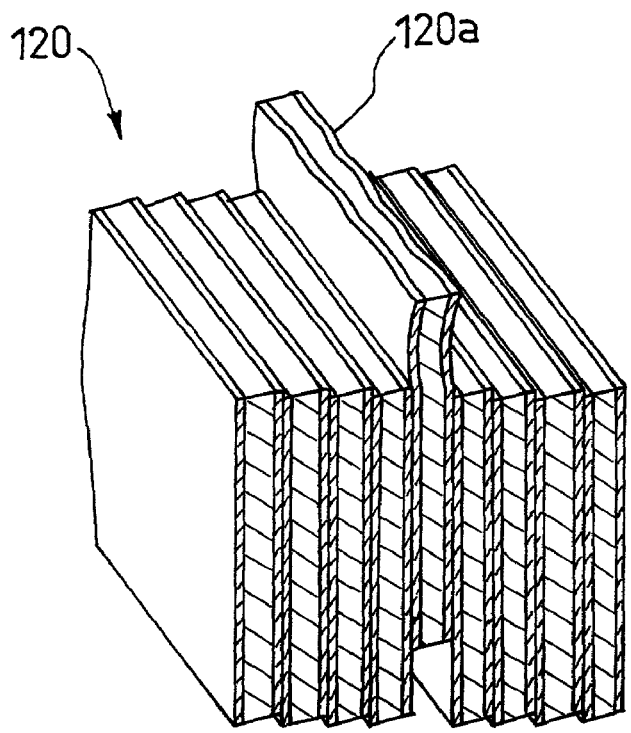
FIG. 5 is an enlarged view of a part A in FIG. 4.

This described tape reel 10 is used for a digital video cassette (DVC) of an M type, but the invention is not limited to the use for this M type. Among the tape reels to be used for the DVC of a type larger than the M type, there may be another ring portion outside the ring portion 13a (See FIG. 4).

Figure 3:
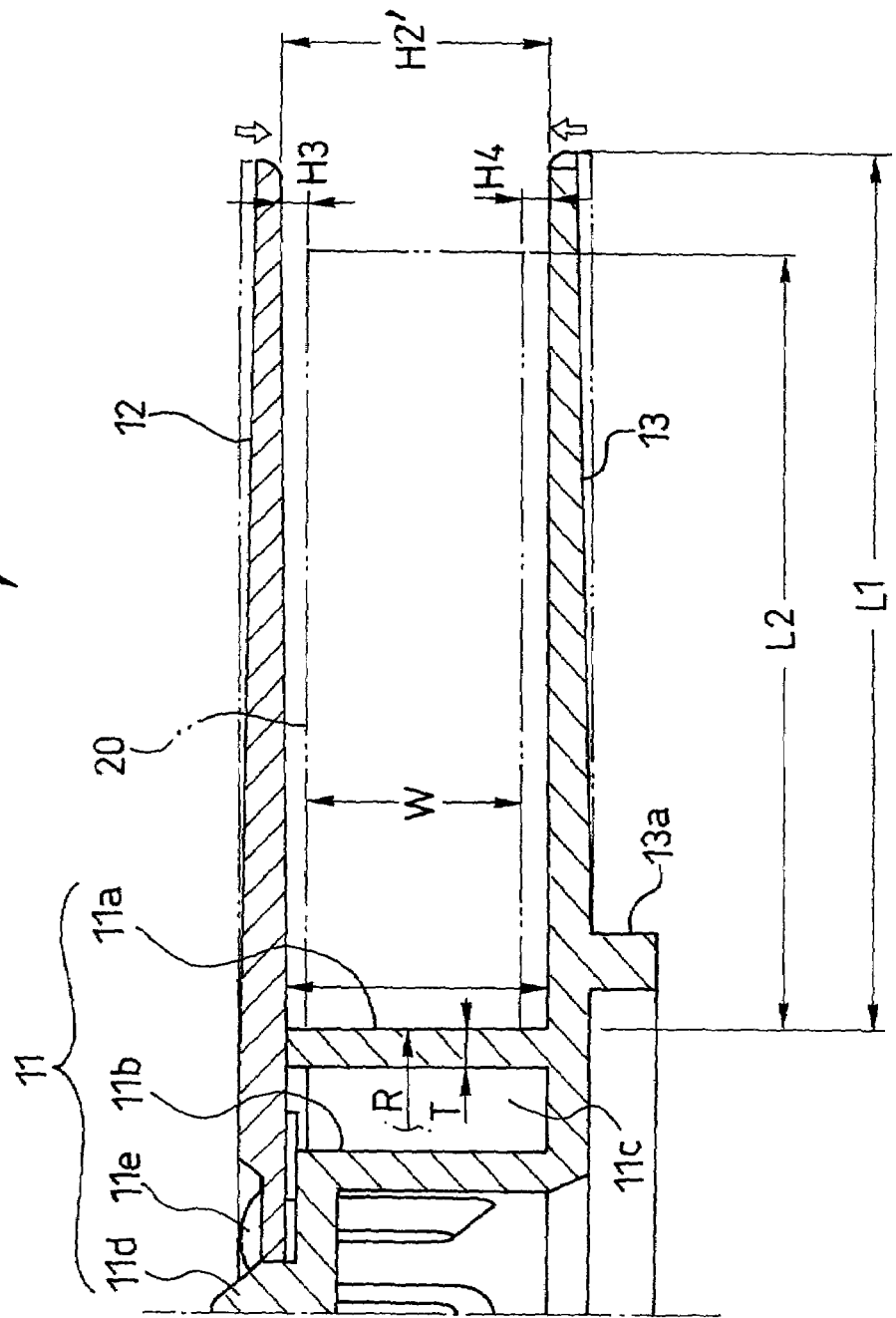
FIG. 3 is a view showing operation of the tape reel according to the invention.

In this embodiment, a width of the magnetic tape 12 is designated as W. A height of the outer peripheral wall 11a of the hub is designated as H1. A distance between the upper and the lower flanges 12, 13 (the distance between the lower face of the upper flange 12 and the upper face of the lower flange 13) is designated as H2 at the most outer circumferential edges of the flanges. A radius of the outer peripheral wall 11a of the hub is designated as R, and a thickness of the outer peripheral wall 11a of the hub is designated as T. A distance from an outer peripheral surface of the outer peripheral wall 11a of the hub to outer circumferential edges of the upper and the lower flanges 12, 13 is designated as L1. As shown in FIG. 3, a distance from the outer peripheral surface of the outer peripheral wall 11a of the hub to the most outer layer of the magnetic tape 20 wrapped around the outer peripheral surface 11a of the hub is designated as L2.

In the tape reel according to this embodiment, the relation H2>H1>W is established as described above.

In this embodiment, as the magnetic tape 20 is being wrapped around the outer peripheral wall 11a of the hub, a distance between the upper and the lower flanges 12, 13 at the most outer circumferential edges of the flanges (in an outer direction from the outer peripheral surface of the outer peripheral wall 11a of the hub) is gradually decreased as shown in FIG. 3, the distance is set as H2'. Specifically, a distance between one of the outer ends (an upper end in the drawings) of the most outer layer of the magnetic tape 20 in a width direction and the lower face of the upper flange 12 is defined as H3. A distance between the other outer end (a lower end in the drawings) and the upper face of the lower flange 13 is defined as H4. These distances H3 and H4 are respectively always within a certain range.

In order to keep the distances H3 and H4 always within the certain range, rigidity of the hub 11, manner of fixing the upper and the lower flanges 12, 13 to the hub 11, material of the tape reel 10 and so on are established. Preferably, the rigidity is determined by setting the thickness T of the outer peripheral wall 11a, by setting shape and thickness of the center part 11b and the support walls 11c, and so on.

Wrapping torque for wrapping the magnetic tape 20 around the tape reel 10 is also established so that the distances H3 and H4 may be always within the certain range.

According to the tape reel 10 having the structure as described above, as the magnetic tape 20 is being wrapped around the outer peripheral wall 11a of the hub, the distance between the upper and the lower flanges 12, 13 is gradually decreased. In other words, while the amount of the magnetic tape 20 wrapped around the outer peripheral wall 11a of the hub is small, the distance between the upper and the lower flanges 12, 13 is rather large. Accordingly, the magnetic tape 20 can be smoothly moved to a neighborhood of the outer peripheral wall 11a of the hub. On the other hand, when the amount of the magnetic tape 20 wrapped around the outer peripheral wall 11a has become large so that an irregular wrapping may be likely to occur, the distance between the upper and the lower flanges 12, 13 is made narrow. Accordingly, the intruded air can be appropriately removed to prevent the irregular wrapping, and at the same time, deformation of the magnetic tape in a width direction of the magnetic tape can be also prevented.

In addition, in this embodiment, it is preferable to use the numerical values and materials as follows:

The radius R of the hub 11 is set from 20 mm to 22.5 mm. Namely, a diameter of the hub 11 is set from 40 mm to 45 mm.

A radius of the flange, namely an amount of the radius of the hub and the distance L1, is set from 47.5 mm to 50 mm. Namely, a diameter of the flange is set from 95 mm to 100 mm.

The height H1 of the outer peripheral wall 11a of the hub is set from 12.8 mm to 13.2 mm.

The distance H2 between the upper and the lower flanges 12, 13 is set from 13.0 mm to 13.5 mm at the most outer circumferential edges of the flanges.

The relation H2>H1 remains.

The width of the magnetic tape 12 is set from 12.63 mm to 12.67 mm.

Material of the hub 11 and the lower flange 13 is made of polycarbonate or complex material including polycarbonate and glass fiber. Material of the upper flange 12 is also made of polycarbonate or complex material including polycarbonate and glass fiber.

The present invention is not limited to the above described embodiment, but appropriate modifications and improvements can be made.

For example, a separate lower flange may be fixed to the hub by welding or so.

The invention is applied not only to the tape reel for the DVC, but can be applied to other types of tape reels for video cassettes and tape reels for data cartridges in a computer.

As described above, according to the tape reel and the method of wrapping the magnetic tape around the tape reel of the invention, the magnetic tape can be smoothly wrapped around the hub without incurring damage of the magnetic tape, and occurrence of abrasion powder and an irregular wrapping.

What is claimed is:

1. A tape reel comprising:
a hub having a cylindrical shape; and
an upper flange and a lower flange respectively provided at an upper end and a lower end of said hub,
wherein a magnetic tape is wrapped around an outer peripheral surface of said hub, and
means for gradually decreasing a distance between said upper flange and said lower flange outside the outer peripheral surface of the hub, as said magnetic tape is being wrapped around said hub, by deflecting said upper and lower flanges towards each other over an entire circumference thereof.

2. The tape reel as set forth in claim 1, wherein a lower face of said upper flange is inclined upwardly towards an outside in a radial direction of said tape reel, and an upper face of said lower flange is inclined downwardly towards the outside in the radial direction of said tape reel, when said magnetic tape is unwrapped.

3. The tape reel as set forth in claim 1, wherein a distance between an upper end of an outermost layer of the magnetic tape in a width direction and a lower face of said upper flange is defined as H3, and a distance between a lower end of the outermost layer of the magnetic tape in the width direction and an upper face of said lower flange is defined as H4, said distances H3 and H4 always remaining within a certain range such that the magnetic tape does not contact either of said upper flange and said lower flange.

* * * * *